No. 874,137. PATENTED DEC. 17, 1907.
C. P. TOLMAN.
AUTOMATIC PRESSURE REGULATOR.
APPLICATION FILED MAY 7, 1906.

2 SHEETS—SHEET 1.

WITNESSES:

INVENTOR
Charles P. Tolman.
BY
ATTORNEY

No. 874,137. PATENTED DEC. 17, 1907.
C. P. TOLMAN.
AUTOMATIC PRESSURE REGULATOR.
APPLICATION FILED MAY 7, 1906.

2 SHEETS—SHEET 2.

WITNESSES:
H. J. Glenn.
J. H. Taylor

Charles P. Tolman
INVENTOR.

BY
Elwin M. Hulse
ATTORNEY.

UNITED STATES PATENT OFFICE.

CHARLES P. TOLMAN, OF NEW YORK, N. Y., ASSIGNOR TO ROTENG ENGINEERING CORPORATION, OF NEW YORK, N. Y., A CORPORATION OF NEW YORK.

AUTOMATIC PRESSURE-REGULATOR.

No. 874,137.  Specification of Letters Patent.  Patented Dec. 17, 1907.

Application filed May 7, 1906. Serial No. 315,460.

*To all whom it may concern:*

Be it known that I, CHARLES P. TOLMAN, a citizen of the United States, residing at New York city, in the State of New York, have invented a new and useful Automatic Pressure-Regulator, of which the following is a specification.

My invention relates to improvements in pressure regulators in which a pressure relief valve or other means for relief of fluid pressure when a predetermined maximum of pressure has been attained, is associated with a cylinder and piston to automatically regulate the pressure of any fluid in a storage tank or reservoir.

The object and nature of my invention will be readily understood by those skilled in the art from the description and explanation, hereinafter set forth, of the accompanying drawing, as an example, from among others, of a device within the spirit of my invention.

My invention consists in the novel features of construction and combination of parts as more fully pointed out and described hereinafter.

Figure 1:
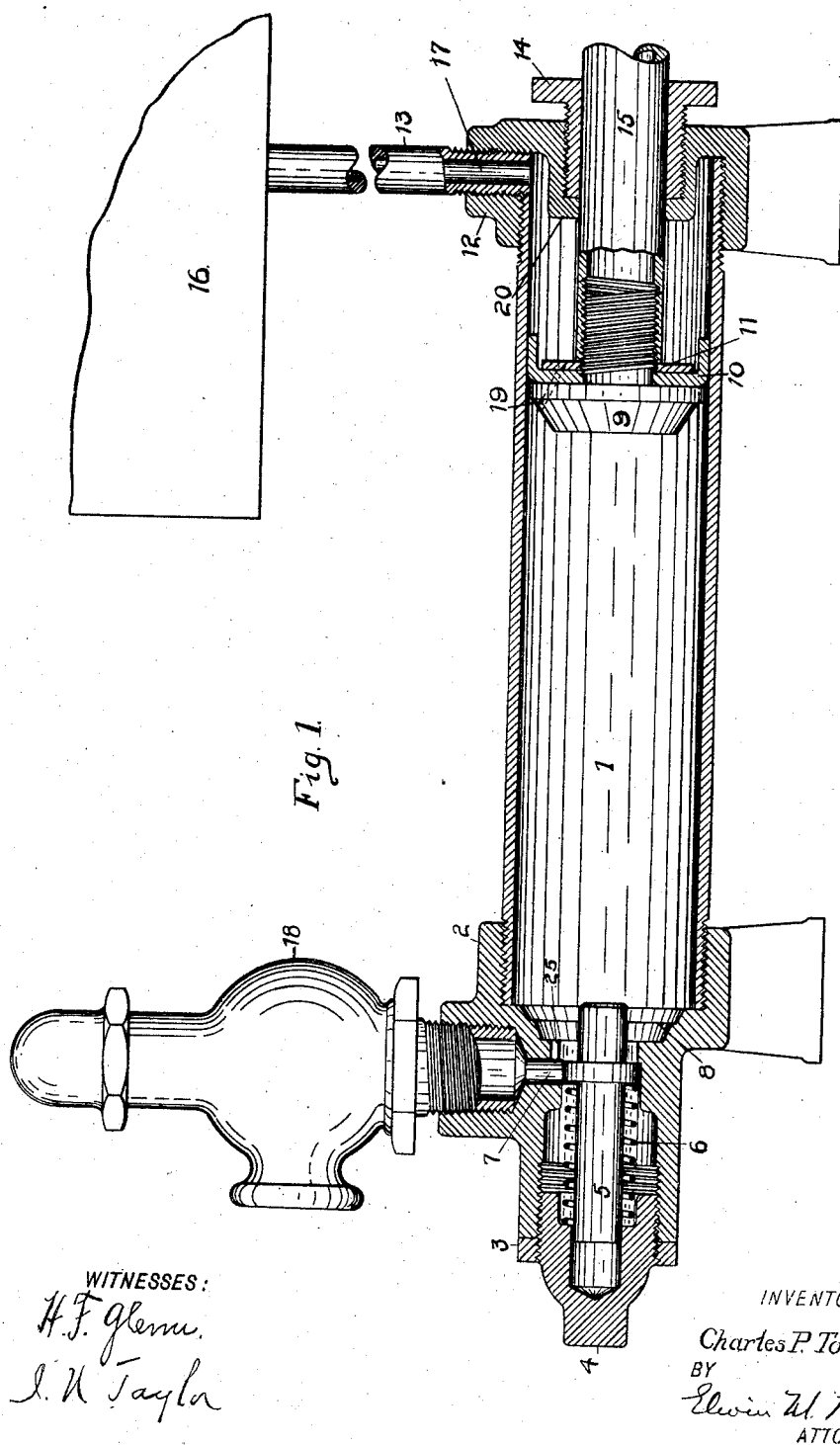
Figure 2:
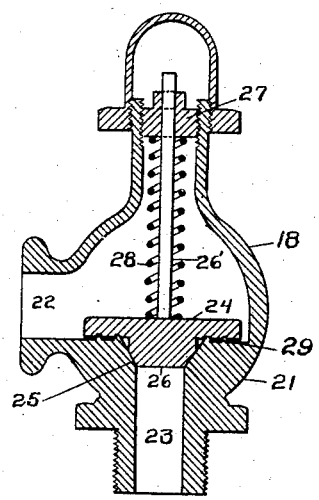
Figure 3:
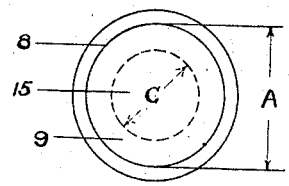

In the drawings, Figure 1, is a vertical cross section of a device constructed in accordance with my invention; Fig. 2 is a cross section of a pressure relief valve, and Fig. 3 is a diagram which will be fully explained hereafter.

Referring to the drawings, a cylinder 1 is provided with a piston 9 and rod 15, said piston head having a beveled face 9 and said rod passing through a suitable cylinder head 12 provided with a packing gland and follower 14. A pipe 13 leads from the pressure reservoir 16 through the head 12 into the interior of the cylinder. The other end of the cylinder preferably terminates in a head 2 which is provided with a seat 8 forming with the companion surface 9 on the piston the equivalent of an ordinary check valve.

A plunger 5 is suitably mounted to have longitudinal motion in the cylinder head 2, one end preferably protruding through the head into seat 8. This plunger is opposed by a suitable means, such as a coiled spring 6 acting between a shoulder on the plunger and an adjustable cap 4, said cap serving to adjust the tension of said spring as desired. Mounted on this head in any suitable pressure relieving means 18, preferably an ordinary pop safety valve of any desirable construction. In the drawing I show one well-known form of pop valve 18, in which a housing 21, having port 22 and fluid passageway 23, is mounted on head 2, passageway 23 being in communication with cylinder 1 through suitable passageways 7 and 25 in head 2. Within the housing is the valve proper consisting of head 24, stem 26', adjusting screw or guide 27, and spring 28 which is carried by the stem. This valve head is prepared in the usual manner to fit a suitable seat 25 in the housing so that a small area 26 shall be normally exposed to reservoir pressure which is present in passageway 23. When the reservoir pressure is great enough to overcome the opposing pressure of spring 28, the valve is raised off its seat 25 and a larger area 29 on said head is subjected to the reservoir pressure thus holding the valve off of seat 25 and permitting the escape of fluid into housing 21 and out through port 22 in the usual manner.

In piston head 9 I provide a by-pass 19 of limited area through which fluid may pass from one side of said piston to the other.

Any mechanism may be connected to the piston rod which it is desired shall be operated by the regulator, such as, a switch, a rheostat, a mechanism for shifting a belt or a clutch, or for controlling a steam valve, or in general, any means for the control of the supply of power to the compressor from any source may be connected to the piston rod.

In the operation of this structure it will be seen that, for example, starting with an empty reservoir, the pressure relieving valve set for a predetermined maximum pressure for the reservoir, the piston being at the extreme right (the drawing showing the piston at or near the position for operating the compressing device,) the compressor put in operation, and the opposing element of the plunger adjusted as desired, the pressure of the reservoir is gradually raised to the point at which the pressure relieving valve is set. The compressed fluid in the reservoir is free during this operation to enter the cylinder 1 through pipe 13 and by-pass 19 to equalize the pressure on both sides of the piston. When the pressure in the reservoir and cylinder reaches the blow-off point of valve 18, this valve is automatically set into operation and the pressure on the plunger side of the piston is relieved faster than by-pass 19 can maintain it. An unbalanced pressure on the piston head is a result of this condition and this unbalanced pressure causes the piston to move toward the plunger and to operate the mechanism connected to the piston rod and designed to stop the compressing device. The piston moves over until it abuts against plunger 5 compressing spring 6 and allowing the piston head to be seated on the seat 8. An area on the piston circumscribed by seat is thus subjected to atmospheric or very low pressure according at what point the pressure relieving valve stops blowing off, and in addition, to the pressure of an opposing element or spring 5, which pressure it will readily be seen must be greater than the predetermined minimum pressure of the reservoir upon the area represented by the difference between the area of the piston circumscribed by the piston seat and the area of the piston rod plus friction. In other words (referring to Fig. 2) let A represent the area of the piston circumscribed by the piston seat 8, X the pound pressure per square inch on that area, B the predetermined minimum pressure of the reservoir, C the area of the piston rod, and Y the friction, it will be found that the following condition must exist, to wit: Spring pressure $+ (X-A) > B(A-C) + Y$, in order that the piston may be moved away from the seat. Given X a constant (within practical limits) for mechanisms of this sort, this operation is controlled by the adjustment of spring 5. As long as the right hand portion of this expression is greater than or equal to the left hand portion thereof the piston is held tight upon seat 8. When the condition becomes that given in the expression the piston is forced away from the seat 8. This permits the compressed fluid which passes through by-pass 19 to be effective over the entire face of that side of the piston, the result being that an unbalanced pressure on the piston once more exists due to the unbalanced area of the piston rod, and the piston is set in motion toward the rod side of the same. The rod, in turn, actuates the attached mechanism which sets the compressing device into operation. When the pressure in the reservoir again reaches the point at which the pressure relieving valve is set, that valve blows off and the piston is set into motion and the operation of the regulator is repeated.

It is apparent that the distance the piston shall travel is determined by the nature of the mechanism which that piston shall operate. For example, if the object desired is to shift a belt, the piston must move a sufficient distance to properly engage the belt with its pulley. It is further apparent that the proportions and adjustments of the parts can be varied and selected to suit the convenience of the user. It is also seen that many different forms of mechanism may be adopted for applying my invention and I do not wish to be confined to the precise structure shown, which is only one means by which my invention is carried out.

What I claim is:

1. In a pressure regulator the combination with a pressure reservoir of a cylinder, a piston, a by-pass in said piston, a piston seat, a plunger, an opposing element to said plunger, and a pressure relieving valve in communication with said cylinder.

2. In a pressure regulator the combination with a pressure reservoir of a cylinder, a piston, a by-pass of limited area in said piston, a piston seat, a plunger, an opposing element to said plunger, means for adjusting said opposing element, and a pressure relieving valve in communication with said cylinder through a suitable passage-way adapted to be closed by said piston.

3. In a pressure regulator the combination with a pressure reservoir of a cylinder, a piston, a by-pass in said piston, a piston seat, a plunger normally protruding through said seat, an adjustable means opposing said plunger and a pop safety valve in communication with said cylinder.

4. In a pressure regulator the combination with a pressure reservoir of a cylinder, a piston, a by-pass in said piston, a piston seat in the cylinder head, a plunger movably mounted within said head and normally protruding through said seat, an opposing element to the plunger, means for adjusting said opposing element and a pop safety valve in communication with the cylinder.

5. In a pressure regulator the combination with a pressure reservoir of a cylinder, a piston, a by-pass in said piston, a piston seat, a plunger normally protruding through said seat and longitudinally movable in the cylinder head, a spring opposing said plunger, a means for adjusting said spring and a pop safety valve in communication with said cylinder through a passage-way which terminates in said piston seat.

6. In a pressure regulator the combination with a pressure reservoir of a cylinder, a piston, a by-pass of limited area in the piston, a piston seat adapted to seat a companion face on the piston, a plunger in the cylinder head normally protruding through said seat and opposed by a suitable spring, means for adjusting said spring to any pressure, and a pop safety valve suitably mounted on said cylinder in communication with said cylinder through said seat.

7. In a pressure regulator the combination with a pressure reservoir of a cylinder suitably connected to said reservoir, a piston, a by-pass in said piston, a piston seat suitably prepared to receive a companion face on said piston, a plunger suitably mounted in said cylinder and adapted to have longitudinal motion within the cylinder structure, an opposing element to said plunger tending to protrude the plunger through said piston seat, and a pop safety valve in communication with said cylinder through said seat.

8. In a pressure regulator the combination of a cylinder, a piston, a by-pass in said piston, a piston seat, means for moving the piston when on said seat, and means in communication with the cylinder for relieving the pressure therein.

9. In a pressure regulator the combination of a cylinder, a piston, a by-pass in said piston, a piston seat, means for relieving the pressure within the cylinder so as to produce an unbalanced pressure on the piston to cause said piston to take said seat and an adjustable means for moving the piston off said seat.

10. In a pressure regulator the combination of a cylinder, a piston slidable therein and having a bypass for the passage of the operative fluid, a plunger carried by the cylinder, a pressure relief means connected to said cylinder and a reservoir for the fluid connected to said cylinder, the parts being so arranged and proportioned that an excess of pressure in the reservoir will cause the piston to move in one direction, while a diminished pressure will cause the piston to move in the opposite direction.

In witness whereof I hereto subscribe my name in the presence of two witnesses.

CHARLES P. TOLMAN.

Witnesses:
EDWARD S. TAYLER,
E. M. HULSE.